United States Patent [19]

Mychajlowskij et al.

[11] Patent Number: 5,288,836
[45] Date of Patent: Feb. 22, 1994

[54] PROCESS FOR PRODUCING POLYCARBONATES FROM NITROGEN DIOL AND AROMATIC DIOL HALOFORMATE.

[75] Inventors: Walter Mychajlowskij, Georgetown; George Liebermann; Dasarao K. Murti, both of Mississauga, all of Canada

[73] Assignee: Xerox Corporation, Stamford, Conn.

[21] Appl. No.: 907,341

[22] Filed: Jul. 1, 1992

[51] Int. Cl.⁵ ............................................. C08G 64/12
[52] U.S. Cl. ................................... 528/198; 528/196; 528/203; 528/495
[58] Field of Search .............. 528/198, 196, 203, 495

[56] References Cited

U.S. PATENT DOCUMENTS

| | | |
|---|---|---|
| 4,115,116 | 9/1978 | Stolka et al. . |
| 4,262,110 | 4/1981 | Mark .................... 528/198 |
| 4,265,990 | 5/1981 | Stolka et al. . |
| 4,369,303 | 1/1983 | Mori et al. . |
| 4,439,507 | 3/1984 | Pan et al. . |
| 4,637,971 | 1/1987 | Takei et al. . |
| 4,722,994 | 2/1988 | Boden . |
| 4,801,517 | 1/1989 | Frechet et al. ........................ 430/59 |
| 4,806,443 | 2/1989 | Yanus et al. . |
| 4,806,444 | 2/1989 | Yanus et al. . |
| 4,835,081 | 5/1989 | Ong et al. . |
| 4,902,758 | 2/1990 | Marks . |
| 4,937,165 | 6/1990 | Ong et al. . |
| 4,959,288 | 9/1990 | Ong et al. . |
| 5,011,906 | 4/1991 | Ong et al. . |

*Primary Examiner*—Harold D. Anderson
*Attorney, Agent, or Firm*—Oliff & Berridge

[57] ABSTRACT

Bishaloformate derivatives of diols, especially bisphenols, are used in a polycondensation reaction under low temperature interfacial polycondensation conditions to obtain high molecular weight polycarbonates or alternating copolycarbonates which are useful as photoreceptor materials.

23 Claims, No Drawings

PROCESS FOR PRODUCING POLYCARBONATES FROM NITROGEN DIOL AND AROMATIC DIOL HALOFORMATE

FIELD OF THE INVENTION

This invention relates to polycarbonates and methods of producing the same, and image receptors containing the same.

BACKGROUND OF THE INVENTION

Electrophotographic imaging systems involve the formation and development of electrostatic latent images on the surface of photoconductive devices referred to in the art as photoreceptors. In these imaging systems, a photoreceptor containing a photoconductive insulating layer is imaged by uniformly electrostatically charging its surface. The photoreceptor is then exposed to a pattern of activating electromagnetic radiation such as light, thereby selectively dissipating the charge in the illuminated areas, causing a latent electrostatic image to be formed in the non-illuminated areas. This latent electrostatic image can be developed with developer compositions containing toner particles, and the developed image can be transferred to a suitable substrate such as paper.

Many known photoconductive members can be selected for incorporation into the electrophotograhic imaging system including, for example, photoconductive insulating materials deposited on conductive substrates, as well as those containing a thin barrier layer film situated between the substrate and the photoconductive composition. The barrier layer is primarily for the purpose of preventing charge injection from the substrate into the photoconductive layer subsequent to charging, as injection could adversely affect the electrical properties of the photoconductive compositions involved.

An electrophotographic imaging member may be provided in a number of forms. The imaging member may be a homogeneous layer of a single material such as vitreous selenium or it may be a composite layer containing a photoconductor and another material. Examples of photoconductive members include those comprised of inorganic and organic materials, layered devices comprised of inorganic or organic compositions, composite layered devices containing photoconductive substances dispersed in other materials, and the like.

U.S. Pat. No. 4,265,990 discloses a layered photoreceptor having separate photogenerating and charge transport layers. The photogenerating layer is capable of photogenerating holes and injecting the photogenerated holes into the charge transport layer.

As more advanced higher speed electrophotographic copiers, duplicators and printers were developed, degradation of image quality was encountered during extended cycling. Moreover, complex, highly sophisticated duplicating and printing systems operating at very high speeds have placed stringent requirements including narrow operating limits on photoreceptors. For example, the numerous layers found in many modern photoconductive imaging members must be highly flexible, adhere well to adjacent layers, and exhibit predictable electrical characteristics within narrow operating limits to provide excellent toner images over many thousands of cycles. One type of multilayered photoreceptor that has been employed as a belt in electrophotographic imaging systems comprises a substrate, a conductive layer, a blocking layer, an adhesive layer, a charge generating layer, a charge transport layer, and a conductive ground strip layer adjacent to one edge of the imaging layers. This photoreceptor may also comprise additional layers such as an optional anti-curl back coating and an optional overcoating layer.

Examples of known photogenerating materials include trigonal selenium and various phthalocyanines. Examples of known hole transport materials include certain diamines dispersed in inactive polycarbonate resin materials.

A polycarbonate is a synthetic thermoplastic resin which can be formed from a dihydroxy compound and a carbonate diester or diacid. A common polycarbonate is derived from bisphenol A (2,2-bis(4-hydroxyphenol)-propane) and phosgene. Polycarbonate polymers based on bisphenol A have been used as the binder for the hole transport molecule N,N'-diphenyl-N,N'-bis-5-methylphenyl-[1,1'biphenyl]-4,4'-diamine in photoreceptors. Other layers of a photoreceptor may also use polycarbonates as a binder material.

U.S. Pat. No. 4,835,081 to Ong et al. discloses an imaging member comprised of a photoconductive layer, and a protective electron transport polymer overcoating having the formula:

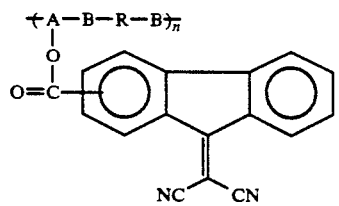

wherein A is a trivalent linkage, B is a functional group such as an ester (—OCO—), carbonate (—OCOO—), or carbamate (—OCONH—); and R is a bivalent linkage, and wherein n represents the number of repeating units, for example, from about 25 to about 300. The polymer overcoating may be synthesized by polycondensation of a bisphenol with a bishaloformate, phosgene, a dialkyl or diaryl carbonate Examples of bishaloformates that may be employed for the polymerization include ethylenegylcol bischloroformate, propyleneglycol bischloroformate, butyleneglycol bischloroformate, diethyleneglycol bischloroformate, triethyleneglycol bischloroformate, and the like. The polymerization can be effected either by melt polymerization under reduced pressure in the presence of a catalyst or by solution polymerization, depending on the nature of reagents used. For example, polycondensation of a functionalized bisphenol and an aliphatic bischloroformate is conducted in a suitable solvent at 10°-30° C. in the presence of a base such as pyridine.

U.S. Pat. Nos. 4,937,165 and 5,011,906, both to Ong et al., disclose a layered photoconductive imaging member comprised of a photogenerating layer comprised of organic or inorganic photoconductive pigments optionally dispersed in an inactive resinous binder and situated between a supporting substrate and a charge transport layer containing N,N-bis(biarylyl)aniline charge transport polymers, optionally doped with a suitable charge transport compound and/or optionally dispersed in a resin binder such as a polycarbonate

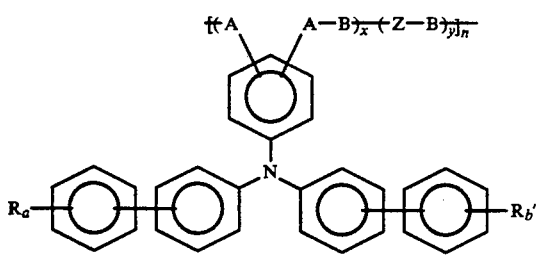

where A is a bifunctional linkage such as O, alkyleneoxy with from about 1 to about 20 carbon atoms such as $OCH_2$, $OCH_2CH_2$, $OCH_2CH_2O$ and the like; B is a bifunctional linkage such as $COR'-'CO$, $COOR''OCO$, $CONHR'-'NHCO$, wherein $R''$ is an alkylene function with from about 1 to about 10 carbon atoms such as methylene, dimethylene, trimethylene, 3,3-dimethylpentamethylene, and the like, an arylene function with from about 6 to about 24 carbon atoms such as phenylene, phenylene, tolylene, anisylene, biphenylene, and the like, ether, or polyether segments, such as $CH_2C-H_2OCH_2CH_2$, $(CH_2CH_2O)_2CH_2CH_2$, $C_6-H_4OC_6H_4$ and the like; Z is alkylenedioxy, arylenedioxy or substituted derivative thereof with 1 to 24 carbon atoms such as 1,3-trimethylenedioxy, 1,4-tetramethylenedioxy, 1,6-hexamethylenedioxy, 1,4-phenylenedioxy, bis(oxyphenyl) propane, bis(oxyphenyl) methane, bis(oxyphenyl)cyclopropane, and the like; and R and R' are substituents such as alkyl, alkoxy, with 1 to about 25 carbon atoms such as methyl, ethyl, propyl, methoxy, ethoxy, propoxy, aryl, or aryloxy such as phenyl, tolyl, phenoxy, and the like, and a halogen such as chlorine, bromine, and the like. The charge transporting N,N-bis(biarylyl)aniline polymers or copolymers can be readily synthesized from the corresponding bifunctionalized monomers such as the corresponding dihydroxy derivatives by polycondensation with suitable bifunctional reagents. The latter can be selected from the group consisting of diacyl halide such as succinyl chloride, adipoyl chloride or azelaoyl chloride, bishaloformates such as ethylene glycol bischloroformate, propylene glycol bischloroformate, or diethylene glycol bischloroformate, and diisocyanates such as hexane diisocyanate, benzene diisocyanate or toluene diisocyanate. Also, the charge transport copolymers can be obtained by copolymerization, for example, with suitable dihydroxy comonomers, such as bisphenol A, bisphenol Z, and other similar diols.

U.S. Pat. No. 4,959,288 to Ong et al. discloses a photoresponsive imaging member comprised of a charge transporting diaryl biarylylamine copolymer situated between a supporting substrate and a photogenerating layer. The charge transporting diaryl biarylylamine copolymers can be readily synthesized by the copolycondensation of stoichiometric quantities of a bifunctionalized monomer such as the corresponding dihydroxy derivatives and a suitable dihydroxy comonomer such as bisphenol A, bisphenol Z, and other similar bisphenols, with appropriate bifunctional reagents. The latter can be selected from the group consisting of diacyl halide such as adipolyl chloride, bishaloformates such as ethylene glycol bischloroformate or diethylene glycol bischloroformate, and diisocyanates such as benzene diisocyanate, toluene diisocyanate, and the like.

Traditional methods of manufacturing polycarbonate polymers usually involve the use of phosgene, which is a highly toxic substance, and/or high temperatures.

U.S. Pat. No. 4,369,303 to Mori et al. discloses a process for preparing an aromatic polyesterpolycarbonate comprised of a dihydroxydiaryl compound, a terephthaloyl chloride and/or isophthaloyl chloride reactant, and phosgene. The aforementioned reactants are polycondensed in the presence of water, methylene chloride and an acid binding agent thereby producing the polycarbonate through an interfacial polymerization process.

U.S. Pat. No. 4,722,994 to Boden discloses a method of producing cyclic oligomeric polycarbonates from the reaction of dihydric phenols and carbonyl halides, involving an interfacial polymerization reaction of the disodium salt of bisphenol-A, a triethylamine polymerization catalyst and methylene chloride with phosgene.

U.S. Pat. No. 4,902,758 to Marks discloses a process for synthesizing high molecular weight segmented block copolycarbonates utilizing an interfacial polymerization reaction. Such polycarbonates may be prepared sequentially from diphenols and tetrahalogenated diphenol.

Many polycarbonate polymers have a limited life span. Efforts to find more durable polymers have been based on melt polycondensation or the use of toxic phosgene gas to produce novel polycarbonate structures.

Polycarbonate polymers based on bisphenol A have been used as a binder for hole transport layers in photoreceptors. Since the introduction of the first products using such photoreceptors, there has been an ongoing effort to find a replacement for these polymers which will extend the life of the photoreceptor. Most of these methods involved the use of toxic phosgene gas to make these polycarbonates. Melt polycondensation offers a number of attractive features in producing polycarbonates, such as avoidance of using phosgene and solvents. However, a number of drawbacks to this process also exist. Due to the high temperatures associated with melt polycondensation, only monomers which can withstand these temperatures can be incorporated into the polycarbonate structure. This limits the structures of the polycarbonates which can be used and makes the incorporation of specialty monomers into the backbone very difficult. The ability to make co-polymers, random as well as alternating, via melt polycondensation is also limited. Due to the high viscosities of polycarbonates, very specialized equipment operating at high temperatures is required to carry out these reactions.

SUMMARY OF THE INVENTION

Diols and bishaloformate derivatives of aromatic diols such as bisphenols are used in a polycondensation reaction under relatively low temperature conditions to obtain high molecular weight polycarbonates or copolycarbonates. Such polycarbonates or copolycarbonates may be used as materials in photoreceptors, particularly in charge generating layers and/or charge transport layers.

The polycondensation reaction of the invention avoids the use of toxic phosgene used in many interfacial polycondensation reactions. The reaction of the invention is conducted at room temperature and is not limited to thermally stable monomers. The present interfacial polycondensation makes possible controlled customized polycarbonates having alternating units derived from different monomers. For example, a polycarbonate can be structured from two monomers; one which could provide the characteristic of compatibility with the charge transporting molecule, the other, low surface energy, to result in an alternating block polymer with derivative properties of both monomers.

The photoreceptor comprises a layer containing a material produced by the process of the invention. The photoreceptor may comprise a layer containing a photoresponsive material and the alternating copolycarbonate as a binder material, or a layer containing or even consisting of the alternating copolycarbonate as a photoresponsive material. As a photoresponsive material, the copolycarbonate may be the sole component of the layer or may be in combination with other materials. In this embodiment, the copolycarbonate may be produced from a diol selected from the group consisting of N,N'-diphenyl-N,N'-bis(3-hydroxyphenyl)-[1,1'-biphenyl]-4,4'-diamine, 3,5-dihydoxyphenyl-9-dicyanomethylenefluorene-4-carboxylate, N,N-bis(4-biphenyl)-3,5-dihydoxyaniline, or bis(m-hydroxyphenyl)-4-biphenylamine. Preferably the layer containing the material is a charge generating layer or a charge transport layer. The photoreceptor may further comprise a protective electron transport overcoating separate from the copolycarbonate-containing layer.

DESCRIPTION OF PREFERRED EMBODIMENTS

The processes of this invention produce polycarbonates and copolycarbonates, many of which are highly desirable for use in image receptors, especially for use as binders for the charge transport layer or charge generating layer of a photoreceptor. In such processes, aromatic diol bishaloformates, preferably bisphenol bischloroformates, are reacted with diols, preferably bisphenols, to produce polycarbonates and preferably alternating copolycarbonate polymers. The necessity of using phosgene and/or high temperatures during melt polycondensation can be circumvented by the processes of the invention. Such processes preferably include interfacial or solution polycondensation. For example, under low temperature polycondensation conditions, the bischloroformate of a bisphenol may be polymerized with a variety of bisphenols or other diols to obtain a high molecular weight homopolymeric polycarbonate or an alternating polycarbonate with a structure $(A-B-A-B-)_n$ where A is a group originating from the bisphenol bischloroformate and B is a residue of another bisphenol or diol group.

The diol may be any suitable diol, including but not limited to (4,4'-dihydroxydiphenyl)-methane, 1,1'-(dihydroxydiphenyl)-cyclohexane (Bisphenol Z), 2,2'-methylene bis(3-methyl-6-tertiarybutylphenol), 2,2'-methylene bis(4-ethyl-6-tertiarybutylphenol), 4,4'-butylidene bis(3-methyl-6-tertiarybutylphenol), 1,1'-(4,4'-dihydroxy-3,3'-dimethyldiphenyl)-cyclohexane, 2,2'-(2,2'-dihydroxy-4,4'-di-tert-butyldiphenyl)-propane, 3,4-(4,4'-dihydroxydiphenyl)-hexane, 1,1'-(4,4'-dihydroxydiphenyl)-1-phenylethane (Bisphenol AP), 2,2-(4,4'-dihydroxydiphenyl)butane, 2,2-(4,4'-dihydroxydiphenyl)-pentane, 3,3-(4,4'-dihydroxydiphenyl)pentane, 2,2-(4,4'-dihydroxydiphenyl)-3-methyl-butane, 2,2(4,4'-dihydroxydiphenyl)-hexane, 2,2-(4,4'-dihydroxydiphenyl)-propane (Bisphenol A), 2,2-(4,4'-dihydroxydiphenyl)-4-methyl-pentane, 2,2-(4,4'-dihydroxydiphenyl)-heptane, 4,4-(4,4'-dihydroxydiphenyl)-heptane, 2,2-(4,4'-dihydroxydiphenyl)tridecane, 2,2-bis(3,5-dichloro-4-hydroxyphenyl)-propane, 2,2-bis(3,3'-dimethyl-4,4'-dihydroxydiphenyl)-propane (Bisphenol C), 2,2-bis(4-hydroxyphenyl)adamantane, 2,2-bis(4-hydroxyphenyl)-hexafluoropropane (Bisphenol AF), bis(4-hydroxyphenyl)-ether, bis(4-hydroxyphenyl)-sulfide, bis(3,5-di-tertiarybutyl-4-hydroxyphenyl)-sulfide, bis(3-methyl-5-tertiarybutyl-4-hydroxyphenyl)-sulfide (Rutenol), bis(4-hydroxyphenyl)-sulfoxide, bis(4-hydroxyphenyl)-sulfone (Bisphenol S), bis(4-hydroxyphenyl)-1-naphthylmethane, bis(3,5-dimethyl-4-hydroxyphenyl)-sulfone, 9,9-bis(4-hydroxyphenyl)-fluorene, 2,7diphydroxypyrene, 6,6'-dihydroxy-3,3,3',3'-tetramethylspiro(bis)indane, 3,3-bis(4-hydroxyphenyl)-phthalide, 2,6-dihydroxy-dibenzo-p-dioxin, 2,6-dihydroxy-thianthrene, 2,7-dihydroxyphenoxathiin, 3,6-dihydroxy-dibenzofuran, 2,7-dihydroxy-carbazole, catechol, resorcinol, quinol, Resorcinol, 1,3-dihydroxynaphthalene, 1,4-dihydroxy-naphthalene, 1,8-dihydroxy-naphthalene, 2,7-dihydroxy-naphthalene, 1,6-dihydroxy-naphthalene, N,N'-diphenyl-N,N'-bis(3-hydroxyphenyl)-[1,1'-biphenyl]-4,4'-diamine, 3,5-dihydoxyphenyl-9-dicyanomethylenefluorene-4-carboxylate, N,N-bis(4-biphenyl)-3,5-dihydoxyaniline, or bis(m-hydroxyphenyl)-4-biphenylamine.

The haloformate may be a haloformate of any suitable aromatic diol including but not limited to (4,4'-dihydroxydiphenyl)-methane bischloroformate, 1,1'-(dihydroxydiphenyl)-cyclohexane bischloroformate, 2,2'-methylene bis(3-methyl-6-tertiarybutylphenol) bischloroformate, 2,2'-methylene bis(4-ethyl-6-tertiarybutylphenol) bischloroformate, 4,4'-butylidene bis(3-methyl-6-tertiarybutylphenol) bischloroformate, 1,1'-(4,4'-dihydroxy-3,3'-dimethyldiphenyl)-cyclohexane bischloroformate, 2,2'-(2,2'-dihydroxy-4,4'-di-tert-butyldiphenyl)-propane bischloroformate, 3,4-(4,4'-dihydroxydiphenyl)hexane bischloroformate, 1,1'-(4,4'-dihydroxydiphenyl)-1-phenyl-ethane bischloroformate, 2,2-(4,4'-dihydroxydiphenyl)-butane bischloroformate, 2,2-(4,4'-dihydroxydiphenyl)-pentane bischloroformate, 3,3-(4,4'-dihydroxydiphenyl)-pentane bischloroformate, 2,2-(4,4'-dihydroxydiphenyl)-3-methyl-butane bischloroformate, 2,2(4,4'-dihydroxydiphenyl)-hexane bischloroformate, 2,2-(4,4'-dihydroxydiphenyl)-propane bischloroformate, 2,2-(4,4'-dihydroxydiphenyl)-4-methyl-pentane bischloroformate, 2,2-(4,4'-dihydroxydiphenyl)heptane bischloroformate, 4,4-(4,4'-dihydroxydiphenyl)heptane bischloroformate, 2,2-(4,4'-dihydroxydiphenyl)tridecane bischloroformate, 2,2-bis(3,5-dichloro-4-hydroxyphenyl)-propane bischloroformate, 2,2-bis(3,3'-dimethyl-4,4'-dihydroxydiphenyl)-propane bischloroformate, 2,2-bis(4-hydroxyphenyl)-adamantane bischloroformate, 2,2-bis(4-hydroxyphenyl)-hexafluoropropane bischloroformate, bis(4-hydroxyphenyl)-ether bischloroformate, bis(4-hydroxyphenyl)-sulfide bischloroformate, bis(3,5-di-tertiarybutyl-4-hydroxyphenyl)-sulfide bischloroformate, bis(3-methyl-5-tertiarybutyl-4-hydroxyphenyl)-sulfide (Rutenol) bischloroformate, bis(4-hydroxyphenyl)-sulfoxide, bis(4-hydroxyphenyl)-sulfone bischloroformate, bis(4-hydroxyphenyl)-1-naphthylmethane bischloroformate, bis(3,5-dimethyl-4-hydroxyphenyl)-sulfone bischloroformate, 9,9-bis(4-hydroxyphenyl)-fluorene bischloroformate, 2,7 diphydroxypyrene bischloroformate, 6,6'-dihydroxy-3,3,3',3'-tetramethylspiro(bis)indane bischloroformate, 3,3-bis(4-hydroxyphenyl)phthalide bischloroformate, 2,6-dihydroxydibenzo-p-dioxin bischloroformate, 2,6-dihydroxythianthrene bischloroformate, 2,7-dihydroxyphenoxathiin bischloroformate, 3,6-dihydroxydibenzofuran bischloroformate, 2,7-dihydroxycarbazole bischloroformate, catechol bischloroformate, resorcinol bischloroformate, quinol bischloroformate, Resorcinol bischloroformate, 1,3-dihydroxynaphthalene bischloroformate, 1,4-dihydroxynaphthalene bischloroformate, 1,8-dihydroxynaphthalene bischloroformate, 2,7-dihydroxynaphthalene bischloroformate, 1,6-dihydroxynaphthalene bischloroformate, N,N'-diphenyl-N,N'-bis(3-hydroxyphenyl)-[1,1'-biphenyl]-4,4'-diamine bischloroformate, 3,5-dihydoxyphenyl-9-dicyanomethylenefluorene-4-carboxylate bischloroformate, N,N-bis(4-biphenyl)- 3,5-dihydoxyaniline bischloroformate, or bis(m-hydroxyphenyl)-4-biphenylamine bischloroformate.

For example, in a preferred embodiment, the diol may be bisphenol Z, and the bisphenol chloroformate may be bisphenol A chloroformate. Polycondensation of these monomers forms an alternating polycarbonate $(-A-Z-A-Z-)_n$. As another preferred example, bisphenol A and bisphenol A chloroformate may be polymerized to form a homopolycarbonate.

To produce a copolycarbonate by interfacial polycondensation, an aqueous solution of a diol may be formed and mixed with an organic solution of an aromatic diol haloformate, wherein the aromatic diol is preferably a bisphenol and the haloformate is preferably a chloroformate. The aqueous solution preferably has a pH that is strongly basic, for example, about 12 or higher, to allow for the diol to dissolve into the aqueous solution. The solution additionally comprises water and preferably also a phase transfer agent which allows the diol to be transferred from the aqueous phase into an organic phase.

The phase transfer agent may be any suitable transfer agent including, but not limited to, benzyltriethylammonium chloride, benzyltrimethylammonium chloride, benzyldimethyldodecylammonium bromide, benzyldimethylstearylammonium chloride, benzyldimethyltetradecylammonium chloride, benzyltributylammonium chloride, bromide or iodide, butyltripropylammonium bromide, cetyldimethylethylammonium bromide, cetyltrimethylammonium bromide or chloride, tetrabutylammonium bromide, chloride, fluoride or iodide, tetraethylammonium bromide, chloride, fluoride or iodide, tetramethylammonium bromide, chloride, fluoride or iodide, tetrapropylammonium bromide, chloride, fluoride or iodide, benzyltriphenylphosphonium chloride or bromide, methyltriphenylphosphonium bromide, methyltriphenylarsonium iodide, cetylpyridinium chloride or hexadecyltributylphosphonium bromide. Benzyltriethylammonium chloride is a preferred base transfer agent.

The organic solution comprises the haloformate and any suitable water immiscible organic solvent. Suitable organic solvents include but are not limited to methylene chloride, carbon tetrachloride, dichloroethane, tetrachloroethane, chloro benzene, dichloro benzene, trichloro benzene, benzene, toluene and xylene, with methylene chloride being the preferred organic solvent.

The aqueous solution may be stirred and cooled. The solutions are stirred together with a noticeable increase in solution viscosity. The organic solvent may be added to the solution while stirring to increase the organic solution volume and the surface area of the interface, and to decrease viscosity to allow for easier stirring of the mixture.

After being thoroughly mixed, the polymer is washed, precipitated out of solution, filtered and dried. Preferably, this is accomplished by transferring the mixture to a separatory funnel where the organic phase is separated from the alkaline water phase. The organic phase may be washed about two to about four times with water until the water phase has a pH from about 6.8 to about 7.2, preferably about 7.0. The solution may be precipitated in alcohol, preferably in methanol, filtered and dried, for example with a vacuum or pressure filter.

Polycarbonate and copolycarbonate polymers produced by this process can be structurally customized to provide desired properties. By choosing appropriate combinations of monomers, copolycarbonate polymers may be produced, for example, that are mechanically robust, that resist degradation, that are compatible with other composition components, that exhibit a low surface energy or that have a combination of such properties or other desirable properties which are often not available from a single polycarbonate. For example, one comonomer could provide desired mechanical properties while the other, alternating comonomer could provide desired chemical and/or electrochemical (e.g., photoresponsive) properties.

Generally, polycarbonates range in molecular weights around 20,000-100,000. Materials of over 100,000 are difficult to make. The process of interfacial polycondensation using phosgene can produce high molecular weight materials (over 100,000), but cannot produce alternating copolycarbonates. The process of melt polycondensation usually produces materials having a molecular weight of under 50,000. With the present process, polymers of a molecular weight of over 100,000 can be produced at low temperatures and without the need to use phosgene. Higher molecular weight polymers are tougher, stronger and more robust materials.

The polycarbonates can also be produced by solution condensation. In this method, diol is added to a low molecular weight organic solvent solution. To this solution is added an acid binding agent, such as tertiary amine or pyridine. The organic solvent may include, but is not limited to, methylene chloride, carbon tetrachloride, dichloroethane, tetrachloroethane, chloro benzene, dichloro benzene, trichloro benzene, benzene, toluene and xylene, with methylene chloride being the preferred organic solvent.

The aromatic diol haloformate is also in an organic solvent solution. The solutions are stirred together with a noticeable increase in solution viscosity. Additional organic solvent may be added to the solution while stirring to increase the organic solution volume and to decrease viscosity to allow for easier stirring of the mixture.

After being thoroughly mixed, the polymer is washed, precipitated out of solution, filtered, and dried. Preferably, this is accomplished by transferring the mixture to a separatory funnel. The organic solution is washed about two to four times with water until the water phase has a pH from about 6.8 to about 7.2, preferably about 7.0. The polymer may be precipitated out of solution in alcohol, preferably in methanol, and filtered, for example with a vacuum or pressure filter.

The invention will now be described in detail with respect to specific examples, it being understood that these examples are intended to be illustrative only and the invention is not intended to be limited to the materials, conditions, or process parameters recited herein.

EXAMPLES

Example 1

3.4 grams of potassium hydroxide (0.06 moles), 0.2 grams of benzyltriethylammonium chloride, 50 milliliters of water and 5.36 grams of bisphenol Z (0.02 moles) are added into a 250 milliliter three-neck round bottom flask equipped with a mechanical stirrer. The solution is stirred for 15 minutes to obtain a clear yellow solution. To this, vigourously stirred solution, is added, all at once, 7.2 grams of bisphenol A bischloroformate (0.022 moles) in 50 milliliters of methylene chloride. Stirring for an addition 2 hours at room temperature results in a noticeable increase in viscosity.

An additional 100 milliliters of methylene chloride are stirred into the mixture at this point and the mixture is transferred to a separatory funnel and the organic phase is separated from the alkaline water phase. The organic phase is washed three times with water (about 150 milliliters each time) until the pH of the water phase is about 7. The solution is then precipitated in 2.5 liters of methanol. The polymer, which is an alternating bisphenol A/bisphenol Z copolymer, is filtered and then dried. A yield of 9 grams of the polymer is obtained, having a molecular weight (weight average) of 120,000.

Example 2

4.2 grams of potassium hydroxide (0.075 moles), 0.5 grams of benzyltriethylammonium chloride, 5.7 grams of bisphenol A (0.025 moles) and 50 milliliters of water are added to a 250 milliliter erlenmeyer flask equipped with a mechanical stirrer. The solution is stirred at room temperature until a clear solution is obtained, in about 15 minutes.

Over a 1 minute period, a solution of 8.825 grams of bisphenol A chloroformate in 50 milliliters of methylene chloride is added, with vigourous stirring, to the solution of bisphenol A. The mixture is stirred for an additional 120 minutes at room temperature with a noticeable increase in viscosity.

An additional 100 milliliters of methylene chloride are added to the mixture and the mixture is worked up in the following manner. The mixture is transferred to a separatory funnel and the organic phase is separated from the alkaline water phase. The organic phase is washed three times with water (about 150 milliliters of water) until the pH is about 7. The solution is then precipitated in 2.5 liters of methanol. The bisphenol A polymer is filtered and then dried. A yield of 10.5 grams of the polymer is obtained, having a molecular weight (weight average) of 147,000.

Example 3

4.2 grams of potassium hydroxide (0.075 moles), 0.5 grams of benzyltriethylammonium chloride, 7.65 grams of bis(3,5-dimethyl-4-hydroxyphenyl)-sulfone (0.025 moles) and 50 milliliters of water are added to a 250 milliliter erlenmeyer flask equipped with a mechanical stirrer. The solution is stirred at room temperature until a clear solution is obtained, in about 15 minutes.

Over a 1 minute period, a solution of 8.825 grams of bisphenol A chloroformate (0.025 moles) in 50 milliliters of methylene chloride is added, with vigourous stirring, to the solution of the dianion of bis(3,5-dimethyl-4-hydroxyphenyl)-sulfone. The mixture is stirred for an additional 120 minutes at room temperature with a noticeable increase in viscosity.

An additional 100 milliliters of methylene chloride are added to the mixture. The mixture is transferred to a separatory funnel and the organic phase is separated from the alkaline water phase. The organic phase is washed three times with water (about 150 milliliters of water) until the pH is about 7. The solution is then precipitated in 2.5 liters of methanol. The polymer, which is an alternating bisphenol A/bis(3,5-dimethyl-4-hydroxyphenyl)-sulfone copolymer, is filtered and then dried. A yield of 12 grams of the polymer is obtained, having a molecular weight (weight average) of 122,000.

Example 4

8.4 grams of potassium hydroxide (0.15 moles), 1.0 grams of benzyltriethylammonium chloride, 17.9 grams of bis(3-methyl-5-tertiarybutyl-4-hydroxyphenyl)-sulfide (Rutenol) (0.05 moles), 50 milliliters of tetrahydrofuran, and 150 milliliters of water are added to a 500 milliliter erlenmeyer flask equipped with a mechanical stirrer. The solution is stirred at room temperature until a clear solution is obtained, in about 15 minutes.

Over a 1 minute period, a solution of 18.6 grams of bisphenol A chloroformate (0.053 moles) in 150 milliliters of methylene chloride is added, with vigourous stirring, to the solution of the dianion of bis(3-methyl-5-tertiarybutyl-4-hydroxyphenyl)-sulfide. The mixture is stirred for an additional 120 minutes at room temperature with a noticeable increase in viscosity.

An additional 150 milliliters of methylene chloride are added to the mixture. The mixture is transferred to a separatory funnel and the organic phase is separated from the alkaline water phase. The organic phase is washed three times with water (about 150 milliliters of water) until the pH is about 7. The solution is then precipitated in 4 liters of methanol. The polymer, which is an alternating bisphenol A/bis(3-methyl-5-tertiarybutyl-4-hydroxyphenyl)-sulfide copolymer, is filtered and then dried. A yield of 28.5 grams of the polymer is obtained, having a molecular weight (weight average) of 35,000.

Example 5

10.5 grams of potassium hydroxide (0.19 moles), 1.0 grams of benzyltriethylammonium chloride, 17.5 grams of 9,9-bis(4-hydroxyphenyl)fluorene (0.05 moles) and 150 milliliters of water are added to a 500 milliliter erlenmeyer flask equipped with a mechanical stirrer. The solution is heated to 50 degrees centigrade with stirring until a clear solution was obtained, in about 15 minutes. The solution is then cooled down to room temperature.

Over a 1 minute period, a solution of 18.6 grams of bisphenol A chloroformate (0.053 moles) in 150 milliliters of methylene chloride is added, with vigourous stirring, to the solution of the dianion of 9,9-bis(4-hydroxyphenyl) fluorene. The mixture is stirred for an additional 120 minutes at room temperature with a noticeable increase in viscosity.

An additional 150 milliliters of methylene chloride are added to the mixture. The mixture is transferred to a separatory funnel and the organic phase is separated from the alkaline water phase. The organic phase is washed three times with water (about 150 milliliters of water) until the pH is about 7. The solution is then precipitated in 4 liters of methanol. The polymer, which is an alternating bisphenol A/9,9-bis(4-hydroxyphenyl)-fluorene copolymer, is filtered and then dried. A yield of 26.5 grams of the polymer is obtained, having a molecular weight (weight average) of 75,000.

Example 6

8.4 grams of potassium hydroxide (0.15 moles), 1.0 grams of benzyltriethylammonium chloride, 12.5 grams of bis(4-hydroxyphenyl)-sulfone (0.05 moles) and 150 milliliters of water are added to a 500 milliliter erlenmeyer flask equipped with a mechanical stirrer. The solution is stirred at room temperature until a clear solution is obtained, in about 15 minutes.

Over a 1 minute period, a solution of 18.6 grams of bisphenol A chloroformate (0.053 moles) in 150 milliliters of methylene chloride is added, with vigourous stirring, to the solution of the dianion of bis(4-hydroxyphenyl)-sulfone. The mixture is stirred for an additional 120 minutes at room temperature with a noticeable increase in viscosity.

An additional 150 milliliters of methylene chloride are added to the mixture. The mixture is transferred to a separatory funnel and the organic phase is separated from the alkaline water phase. The organic phase is washed three times with water (about 150 milliliters of water) until the pH is about 7. The solution is then precipitated in 4 liters of methanol. The polymer, which is an alternating bisphenol A/bis(4-hydroxyphenyl)-sulfone copolymer, is filtered and then dried. A yield of 23.5 grams of the polymer is obtained, having a molecular weight (weight average) of 119,000.

Example 7

5.6 grams of potassium hydroxide (0.01 moles), 0.9 grams of benzyltriethylammonium chloride, 10.4 grams of N,N'-diphenyl-N,N'-bis(3-hydroxyphenyl)-[1,1'-biphenyl]-4,4'-diamine (0.02 moles) and 100 milliliters of water are added to a 500 milliliter erlenmeyer flask equipped with a mechanical stirrer and blanketted with an inert nitrogen atmosphere. This mixture is heated to 85 degrees centigrade for 15 minutes to effect disolution. The solution is then cooled to room temperature with an ice bath.

Over a 1 minute period, a solution of 7.7 grams of bisphenol A chloroformate (0.022 moles) in 200 milliliters of methylene chloride is added, with vigourous stirring, to the solution of the dianion of N,N'-diphenyl-N,N'-bis(3-hydroxyphenyl)-[1,1'-biphenyl]-4,4'-diamine. The mixture is stirred for an additional 4 hours at room temperature with a noticeable increase in viscosity. To this mixture is then added 1.0 milliliters of triethyl amine and stirring continued for one more hour.

An additional 200 milliliters of methylene chloride are added to the mixture. The mixture is transferred to a separatory funnel and the organic phase is separated from the alkaline water phase. The organic phase is washed three times with water (about 150 milliliters of water) until the pH is about 7. The solution is then precipitated in 4 liters of methanol. The polymer, which is an alternating bisphenol A/N,N'-diphenyl-N,N'-bis(3-hydroxyphenyl)-[1,1'-biphenyl]-4,4'-diamine copolymer, is filtered and then dried. A yield of 20.5 grams of the polymer is obtained, having a molecular weight (weight average) of 121,000.

Example 8

A layered photoresponsive imaging member comprising N,N'-diphenyl-N,N'bis(3-methylphenyl)-[1,1'-biphenyl]-4,4'-diamine molecularly dispersed in the alternating copolymer of bisphenol A/bisphenol Z binder of Example I as the hole transport layer, and a trigonal selenium generator layer is fabricated as follows:

A dispersion of trigonal selenium and poly(N-vinyl carbazole) is prepared by ball milling 1.6 grams of trigonal selenium and 1.6 grams of poly(N-vinyl carbazole) in 14 milliliters each of tetrahydrofuran and toluene. Ten grams of the resulting slurry is diluted with a solution of 0.24 grams of N,N'-diphenyl-N,N'bis(3-methylphenyl)-[1,1'-biphenyl]-4,4'-diamine in 5 milliliters each of tetrahydrofuran and toluene. A 1.5 micron thick photogenerator layer is fabricated by coating the above dispersion onto an aluminized Mylar ® substrate, thickness of 75 microns, with a Bird film applicator, followed by drying in a forced air oven at 135° C. for 5 minutes. A solution for the charge transport layer is then prepared by dissolving 0.8 grams of N,N'-diphenyl-N,N'bis(3-methylphenyl)-[1,1'-biphenyl]-4,4'-diamine and 1.2 grams of the polymer binder of Example I in 10 milliliters of methylene chloride. This solution is coated over the photogenerator layer by means of a Bird film applicator. The resulting member is dried in a forced air oven at 135° C. for 20 minutes, resulting in a 20 micron thick charge transport layer.

A solution for the charge transport layer of imaging member identified as control is prepared by dissolving 0.8 grams of N,N'-diphenyl-N,N'bis(3-methylphenyl)-[1,1'-biphenyl]-4,4'-diamine and 1.2 grams of bisphenol A polycarbonate (Makrolon 5705 ®) in 10 milliliters of methylene chloride. This solution is coated over the photogenerator layer by means of a Bird film applicator. The resulting layered photoconductive imaging member is dried in a forced air oven at 135° C. for 20 minutes, resulting in a 20 micron thick charge transport layer.

The layered photoresponsive imaging members are tested electrically as follows:

The xerographic electrical properties of the aforementioned imaging members are determined by electrostatically charging the surfaces thereof with a corona discharge source until the surface potentials, as measured by a capacitively coupled probe attached to an electrometer, attains an initial value $V_o$ of about $-800$ volts. After resting for 0.5 second in the dark, the charged members reach a surface potential of $V_{ddp}$, dark development potential, and each member is then exposed to light from a filtered Xenon lamp with a XBO 150 watt bulb. A reduction in surface potential to a $V_{bg}$ value, background potential, due to photodischarge effect is observed. The background potential is reduced by exposing with a light intensity about 10 times greater than the expose energy. The resulting potential on the imaging member is designated as the residual potential, Vr. The dark decay in volt/second is calculated as $(V_o - V_{ddp})/0.5$. The percent of photodischarge is calculated as 100 percent $(V_{ddp} - V_{bg})/V_{ddp}$. The desired wavelength and energy of the expose light is determined by the type of filters placed in front of the lamp. The broad band white light (400 to 700 nanometers) photosensitivity of these imaging members is measured by using an infrared cut-off filter whereas the monochromatic light photosensitivity is determined using narrow band-pass filter. The photosensitivity of the imaging members is usually provided in terms of the amount of expose energy in erg/cm$^2$, designated as $E_{\frac{1}{2}}$, required to achieve 50 percent of photodischarge from the dark development potential. The higher the photosensitivity, the smaller is the $E_{\frac{1}{2}}$ value. The devices are subjected to 1000 cycles of repeated charging, discharging and erase to determine the cycling stability. Changes in Vddp, Vbg, Vres are indicated as ΔVddp, ΔVbg, ΔVres.

A summary of the results of the electrical testing of the imaging members is shown on Table 1. For the imaging member based on the alternating copolymer of bisphenol A/bisphenol Z of Example I as the binder, the acceptance potential is −800 volts, the residual potential is −20 volts and the photosensitivity ($E_{\frac{1}{2}}$) is 2.3 ergs/cm$^2$. The results obtained with a control imaging member based on bisphenol A polycarbonate (Makrolon 5705 ®) as the polymer binder and shown on Table 1 indicate that the acceptance potential is −800 volts, the residual potential is −22 volts and the photosensitivity is 2.1 ergs/cm$^2$. The imaging members are subjected to 1000 cycles of repeated charging, discharging and erase and exhibit excellent cycling stability as shown on Table 1. The results indicate excellent cycling stability with the polymer binder of Example I.

TABLE 1

| | Xerographic cycling stability | |
|---|---|---|
| Xerographic parameters | Control device Makrolon 5705 as binder | Alternating copolymer of Example I as binder |
| $V_{ddp}(V)$ | −800 | −800 |
| $E_{1/2}$(ergs/cm$^2$) | 2.1 | 2.3 |
| $V_{residual}(V)$ | −22 | −20 |
| Cycling data | | |
| No. of cycles | 1000 | 1000 |
| $\Delta V_{ddp}(V)$ | −36 | −40 |
| $\Delta V_{bkg}(V)$ | 5 | 0 |
| $\Delta V_{residual}(V)$ | 10 | 10 |

Example 9

A layered photoresponsive imaging member comprising an alternating copolymer of bisphenol A and N,N'-diphenyl-N,N'-bis(3-hydroxyphenyl)-[1,1'-biphenyl]-4,4'-diamine of Example 7 as the hole transport layer, and a vanadyl phthalocyanine generator layer is fabricated as follows:

A dispersion of vanadyl phthalocyanine and polyester is prepared by ball milling 0.07 grams of vanadyl phthalocyanine and 0.13 grams of Vitel PE-100 polyester (Goodyear) in 12 milliliters each of methylene chloride for 24 hours. A 1.0 micron thick photogenerator layer is fabricated by coating the above dispersion onto a titanized Mylar ® substrate, thickness of 75 microns, with a Bird film applicator, followed by drying in a forced air oven at 135° C. for 5 minutes. A solution is prepared by dissolving 1.0 grams of the alternating copolymer of bisphenol A and N,N'-diphenyl-N,N'-bis(3-hydroxyphenyl)-[1,1'-biphenyl]-4,4'-diamine in 10 milliliters of methylene chloride. This solution is coated over the photogenerator layer by means of a Bird film applicator. The resulting member is dried in a forced air oven at 135° C. for 20 minutes, resulting in a 20 micron thick charge transport layer. Two photoresponsive imaging members are fabricated with alternating copolymers identified as sample numbers 25502-34 and 25502-35 of slightly different molecular weights. Sample number 25502-34 has a weight average molecular weight of 134,700 and a number average molecular weight of 50,800 while sample number 25502-35 has a weight average molecular weight of 125,400 and a number average molecular weight of 52,800.

The layered photoresponsive imaging members are tested electrically in accordance with the procedure described in Example 8.

A summary of the results of the electrical testing of the imaging members is shown on Table 2. The results indicate excellent cycling stability with the imaging members comprised of an alternating copolymer of bisphenol A and N,N'-diphenyl-N,N'-bis(3-hydroxyphenyl)-[1,1'-biphenyl]-4,4'-diamine as the charge transport layer.

TABLE 2

| | Xerographic cycling stability | |
|---|---|---|
| Xerographic parameters | Sample number 25502-34 Mw = 134,700 Mn = 50,800 | Sample number 25502-35 Mw = 125,400 Mn = 52,800 |
| $V_{ddp}(V)$ | −800 | −800 |
| $E_{1/2}$(ergs/cm$^2$) | 9.3 | 9.5 |
| $V_{residual}(V)$ | −100 | −80 |
| Cycling data | | |
| No. of cycles | 1000 | 1000 |
| $\Delta V_{ddp}(V)$ | 0 | 0 |
| $\Delta V_{bkg}(V)$ | 10 | 20 |
| $\Delta V_{residual}(V)$ | 10 | 30 |

What is claimed is:

1. A process for producing a polycarbonate, comprising polymerizing a diol selected from the group consisting of N,N'-diphenyl-N,N'-bis(3-hydroxyphenyl)-[1,1'-biphenyl]-4,4'-diamine, 3,5-dihydroxyphenyl-9-dicyanomethylene-4-carboxylate,N,N-bis(4-biphenyl)-3,5-dihydoxyaniline, and bis(m-hydroxyphenyl)-4-bisphenylamine with an aromatic diol haloformate.

2. The process of claim 1, wherein said aromatic diol haloformate is a bisphenol haloformate.

3. The process of claim 2, wherein said haloformate is a chloroformate.

4. The process of claim 1, wherein said diol is a bisphenol.

5. The process of claim 1, wherein said diol is a first bisphenol and said aromatic diol haloformate is a haloformate of said first bisphenol.

6. The process of claim 2, wherein said diol is a first bisphenol and said bisphenol haloformate is a haloformate of a second bisphenol which is different from said first bisphenol.

7. The process of claim 1, wherein said polymerizing step is at a temperature below a melting temperature of said diol and below a melting temperature of said aromatic diol haloformate.

8. The process of claim 1, wherein said polymerizing step is at about room temperature.

9. The process of claim 1, wherein said polymerizing step is an interfacial polymerizing step.

10. The process of claim 6, wherein said bisphenol haloformate is selected from the group consisting of (4,4'-dihydroxydiphenyl)-methane bischloroformate, 1,1'-(dihydroxy-diphenyl)-cyclohexane bischloroformate, 2,2'-methylene bis(3-methyl-6-tertiarybutylphenol)bischloroformate, 2,2'-methylene bis(4-ethyl-6-tertiarybutylphenol)bischloroformate, 4,4'-butylidene bis(3-methyl-6-tertiarybutylphenol)bischloroformate, 1,1'-(4,4'-dihydroxy-3,3'-dimethyldiphenyl)-cyclohexane bischloroformate, 2,2'-(2,2'-dihydroxy-4,4'-ditertbutyldiphenyl)-propane bischloroformate, 3,4-(4,4'-dihydroxydiphenyl)-hexane bischloroformate, 1,1'-(4,4'-dihydroxydiphenyl)-1-phenyl-ethane bischloroformate, 2,2-(4,4'-dihydroxydiphenyl)-butane bischloroformate, 2,2-(4,4-dihydroxydiphenyl)-pentane bischloroformate, 3,3-(4,4'-dihydroxydiphenyl)-pentane bischloroformate, 2,2-(4,4'-dihydroxydiphenyl)-3-methylbutane bischloroformate, 2,2(4,4'-dihydroxydiphenyl)-hexane bischloroformate, 2,2-(4,4'-dihydroxydiphenyl)-propane bischloroformate, 2,2-(4,4'-dihydroxydiphenyl)-4-methyl-pentane bischloroformate, 2,2-(4,4'-dihydroxydiphenyl)-heptane bischloroformate, 4,4-(4,4'-dihydroxydiphenyl)-heptane bischloroformate, 2,2-(4,4'-dihydroxydiphenyl)-tridecane bischloroformate, 2,2-bis(3,5-dichloro-4-hydroxyphenyl)-propane bischloroformate, 2,2-bis(3,3'-dimethyl-4,4'-dihydroxydiphenyl)-propane bischloroformate, 2,2-bis(4-hydroxyphenyl)-adamantane bischloroformate, 2,2-bis(4-hydroxyphenyl)-hexafluoropropane bischloroformate, bis(4-hydroxyphenyl)-ether bischloroformate, bis(4-hydroxyphenyl)-sulfide bischloroformate, bis(3-methyl-5-tertiarybutyl-4-hydroxyphenyl)-sulfide (Rutenol) bischloroformate, bis(4-hydroxyphenyl)-sulfoxide, bis(4-hydroxyphenyl)-sulfone bischloroformate, bis(4-hydroxyphenyl)-1-naphthylmethane bischloroformate, bis(3,5-dimethyl-4-hydroxyphenyl)-sulfone bischloroformate, 9,9-bis(4-hydroxyphenyl)fluorene bischloroformate, 2,7 diphydroxypyrene bischloroformate, 6,6'-dihydroxy-3,3,3', 3'-tetramethylspiro(bis)indane bischloroformate, 3,3-bis(4-hydroxyphenyl)phthalide bischloroformate, 2,6-dihydroxydibenzo-p-dioxin bischloroformate, 2,6-dihydroxythianthrene bischloroformate, 2,7-dihydroxyphenoxathiin bischloroformate, 3,6-dihydroxydibenzofuran bischloroformate, 2,7-dihydroxycarbazole bischloroformate, catechol bischloroformate, resorcinol bischloroformate, quinol bischloroformate, 1,3-dihydroxynaphthalene bischloroformate, 1,4-dihydroxynaphthalene bischloroformate, 1,8-dihydroxynaphthalene bischloroformate, 2,7-dihydroxynaphthalene bischloroformate, and 1,6-dihydroxynaphthalene bischloroformate N,N'-diphenyl-N,N'-bis(3-hydroxyphenyl)-[1,1'-biphenyl]-4,4'-diamine bischloroformate, 3,5-dihydoxyphenyl-9-dicyanomethylenefluorene-4-carboxylate bischloroformate, N,N-bis(4-biphenyl)-3,5-dihydoxyaniline bischloroformate, and bis(m-hydroxyphenyl)-4-biphenylamine bischloroformate.

11. The process of claim 1, wherein said diol is in an aqueous solution and said haloformate is in an organic solution.

12. The process of claim 11, wherein said aqueous solution has a pH of at least about 12.

13. The process of claim 11, wherein said aqueous solution comprises a phase transfer catalyst.

14. The process of claim 11, further comprising stirring said organic solution into said aqueous solution to form a viscous mixture, stirring said viscous mixture, and separating said viscous mixture into an organic phase and an aqueous phase.

15. The process of claim 14, further comprising precipitating a solution of the organic phase in alcohol, yielding a polymer.

16. The process of claim 1, wherein said process is free from phosgene.

17. The process of claim 6, wherein said polymerizing is at a temperature below a melting temperature of said first bisphenol and below a melting temperature of said bisphenol haloformate.

18. The process of claim 6, wherein said bisphenol is in an aqueous solution and said haloformate is in an organic solution.

19. The process of claim 18, wherein said aqueous solution has a pH of at least about 12.

20. The process of claim 18, wherein said aqueous solution comprises a phase transfer catalyst.

21. The process of claim 18, further comprising stirring said organic solution into said aqueous solution to form a viscous mixture, stirring said viscous mixture, separating said viscous mixture into an organic phase and an aqueous phase, and precipitating a solution of the organic phase in alcohol, yielding a polymer.

22. The process of claim 1, wherein the polycarbonate is an alternating copolymer.

23. The process of claim 1, wherein the polycarbonate is a homopolymer.

* * * * *